US008022649B2

(12) United States Patent
Pollock et al.

(10) Patent No.: US 8,022,649 B2
(45) Date of Patent: Sep. 20, 2011

(54) CONTROL OF SWITCHED RELUCTANCE MACHINES

(75) Inventors: Charles Pollock, Oakham (GB); Helen Geraldine Phyllis Pollock, Oakham (GB)

(73) Assignee: Black & Decker Inc., Newark, DE (US)

( * ) Notice: Subject to any disclaimer, the term of this patent is extended or adjusted under 35 U.S.C. 154(b) by 625 days.

(21) Appl. No.: 12/092,159

(22) PCT Filed: Nov. 1, 2006

(86) PCT No.: PCT/GB2006/004080
§ 371 (c)(1),
(2), (4) Date: Nov. 3, 2008

(87) PCT Pub. No.: WO2007/052026
PCT Pub. Date: May 10, 2007

(65) Prior Publication Data
US 2009/0218973 A1    Sep. 3, 2009

(30) Foreign Application Priority Data
Nov. 3, 2005    (EP) ..................................... 05256806

(51) Int. Cl.
*H02P 6/18* (2006.01)
(52) U.S. Cl. .................... 318/400.32; 318/561; 318/701
(58) Field of Classification Search ............. 318/400.32, 318/138, 439, 561, 701
See application file for complete search history.

(56) References Cited

U.S. PATENT DOCUMENTS

| 4,031,440 | A | | 6/1977 | Christian et al. |
| 4,670,696 | A | | 6/1987 | Byrne et al. |
| 5,015,939 | A | | 5/1991 | Konecny |
| 5,589,752 | A | * | 12/1996 | Iwasaki et al. ................ 318/701 |
| 6,107,763 | A | | 8/2000 | Rossi |
| 6,140,729 | A | | 10/2000 | Pollock et al. |
| 6,150,778 | A | * | 11/2000 | Morris ....................... 318/254.1 |
| 6,528,967 | B2 | | 3/2003 | Hallidy |
| 6,538,403 | B2 | | 3/2003 | Gorti et al. |
| 6,541,936 | B2 | | 4/2003 | Viti |
| 6,731,083 | B2 | * | 5/2004 | Marcinkiewicz .......... 318/254.2 |
| 6,788,020 | B1 | | 9/2004 | Pollock et al. |
| 6,850,029 | B1 | | 2/2005 | Pollock et al. |
| 6,867,561 | B1 | | 3/2005 | Pollock et al. |
| 7,170,261 | B2 | | 1/2007 | Walter et al. |

* cited by examiner

*Primary Examiner* — Walter Benson
*Assistant Examiner* — David S Luo
(74) *Attorney, Agent, or Firm* — Amir Rohani

(57) ABSTRACT

A flux switching electric motor (102) is disclosed. The motor comprises a rotor (104), a stator (106), field windings (124, 126) and armature windings (128, 130). #A microcontroller (134) controls supply of electrical current to the field and armature windings. A rotor position sensor includes a divider for (i) receiving an input signal dependent upon the rate of change of current in at least one field winding, (ii) receiving an input signal dependent upon the voltage across at least one armature winding, current through which causes at least part of the current in the field winding, and (iii) providing the microcontroller (134) with a control signal which is dependent upon the ratio of the input signals received by the divider.

16 Claims, 16 Drawing Sheets

CONTROL OF SWITCHED RELUCTANCE MACHINES

CROSS-REFERENCE TO RELATED APPLICATIONS

This application is a U.S. National State Application of International Application No. PCT/GB2006/004080, Filed Nov. 1, 2006; and claims the benefit of European Application No. 05256806 filed Nov. 3, 2005.

The present invention relates to control of electrical machines, and relates particularly, but not exclusively, to control of flux switching electric motors or generators without the necessity of a mechanical rotor position sensor.

Flux switching motors can be used in many applications, since they do not require the use of commutators or brushes in supplying electrical power to the rotor of the motor. Since these components are subject to significant wear, it is highly desirable to avoid their use.

The principle of operation of a flux switching motor is shown in FIGS. 1 to 9. A flux switching motor 2 has a rotor 4 having a pair of poles 6, 8 and is rotatably mounted within a stator 10 having four stator teeth 12, 14, 16, 18. A field coil 20 is wound such that windings of the field coil 20 are arranged in diametrically opposite slots 22, 24 of the stator 10. The field coil 20 carries unidirectional current (in the sense that the polarity of voltage pulses applied to the windings of the coil 20 is not reversed) in its windings, the direction of current flow in the windings in slot 22 being opposite to that of the windings in slot 24.

Similarly, an armature coil 26 is arranged at right angles to the field coil 20 such that its windings are arranged in diametrically opposite slots 28, 30 of the stator. The armature coil 26 carries current in its windings such that the direction of current in the windings in slot 28 is opposite to that of the current in the windings in slot 30. However, in contrast to the voltage supplied to the field coil 20, voltage is supplied to the armature coil 26 in the form of pulses having reversible polarity, for reasons which will be explained in more detail below.

When electrical current flows through the field 20 and armature 26 coils in the direction shown in FIG. 1 (i.e. A+ and F+ into the page and A− and F− out of the page), magnetic flux passes as shown between the oppositely arranged stator teeth 14, 18, as a result of which the rotor 4 tends to align itself along the direction of magnetic flux. When the direction of current flowing through the armature coil 26 is reversed but the direction of current flow through the field coil 20 remains unchanged, as shown in FIG. 2, the direction of the resultant magnetic field acting through the stator 4 is changed by 90 degrees, as a result of which magnetic flux passes between the oppositely arranged stator teeth 12, 16, i.e. at right angles to the oppositely arranged stator teeth 14, 18. The rotor again tends to align itself along the direction of magnetic flux, causing anticlockwise rotation of the rotor 4 through a right angle as shown in FIGS. 2 to 5.

If the direction of current flow through the armature coil 26 is again reversed, while maintaining the direction of current flow in the field coil 20 unchanged, magnetic flux again passes between stator teeth 14, 18 as shown in FIG. 6. This causes the rotor 4 to rotate anticlockwise through a further right angle as shown in FIGS. 6 to 9 to return to the arrangement shown in FIG. 1. This therefore represents a complete cycle of the 2-pole motor 2 shown in FIGS. 1 to 9.

In order to control rotation of the rotor 4 relative to the stator 10, reversal of the direction of current flow in the windings of the armature coil 26 must be synchronised with rotation of the rotor 4 relative to the stator 10. In order to control the switching of the current through the armature coil 26, therefore, existing flux switching motors needed to be provided with means for indicating the rotational position of the rotor 4. This was usually an optical or magnetic position sensor mounted to the rotor shaft, the operation of which will be familiar to persons skilled in the art and will therefore not be described in more detail. Such position sensors need to be very accurately aligned during manufacture of the motor, which in turn significantly increases the cost of manufacture of the motor.

WO 2004/025822 discloses a flux switching motor in which switching of the polarity of voltage pulses applied to the armature coils of the motor can be controlled without the use of a mechanical rotor position sensor. Such a motor is shown in FIG. 10 and has a pair of field coils 40, 42 and a pair of armature coils 44, 46. Each of the coils 40, 42, 44, 46 has a pitch double that of stator teeth 48, as a result of which the magnetic fields generated in one coil expend through an adjacent coil. As a result of this overlap, there is significant mutual inductance between the armature and field coils, the mutual inductance being dependent upon the rotational position of the rotor. This enables the rotational position of the rotor to be determined by monitoring voltages induced in the field windings as a result of current flow in the armature windings.

Preferred embodiments of the present invention seek to improve the operation of such machines.

According to an aspect of the present invention, there is provided an electrical machine for converting electrical energy into mechanical energy and/or mechanical energy into electrical energy, the machine comprising:— a rotor having a plurality of rotor poles;

a stator for rotatably receiving said rotor and having (i) at least one field magnet device for generating a first magnetomotive force between said rotor and said stator and including at least one first electrical winding, and (ii) at least one armature magnet device including at least one second electrical winding adapted to carry electrical current varying in synchronism with rotation of said rotor relative to said stator to generate a second magnetomotive force having a component transverse to said first magnetomotive force;

at least one control device for controlling supply of electrical current to or from the or each said second electrical winding; and at least one rotor position sensor device for detecting at least one electrical signal related to the rotational position of the rotor relative to the stator and induced in a respective said first or second electrical winding as a result of a current passing through a respective second or first electrical winding, wherein at least one said rotor position sensor device comprises at least one divider device for (i) receiving at least one first electrical input signal related to the rate of change of current in at least one said first or second winding, (ii) receiving at least one respective second electrical input signal related to the voltage across at least one respective said second or first winding, current through which causes at least part of at least one said first electrical input signal, and (iii) providing to at least one said control device at least one respective control signal related to the ratio of at least one said first electrical input signal and at least one said second electrical input signal.

The present invention is based on the discovery that in a machine, such as a flux switching motor, in which the voltage across a first winding (for example a field winding) is substantially constant, the ratio of the rate of change of current flowing in a first winding to the voltage across a second winding (for example an armature winding) which is magnetically coupled to the first winding such that current flowing in the second winding induces a voltage in the first winding, gives a measure of the mutual inductance between the two windings which is related to the rotational position of the rotor and is largely independent of the voltage applied to the second winding. This provides the advantage of enabling information dependent upon the rotational position of the rotor relative to the stator to be determined even when the voltage across the second windings (for example the armature windings) of the machine changes rapidly. This in turn can be used to control supply of electrical power to or from the machine to maximise efficiency of operation of the machine. However, the present invention is also found to have the surprising advantage that this approximation under certain circumstances also holds when the voltage across the second windings varies quite significantly, which means that the machine can be easily controlled over a wide range of operating conditions.

At least one said divider device may be adapted to provide a digital control signal.

This provides the advantage of enabling the output signal of the divider device to be directly usable within a digital controller, such as a microprocessor, for controlling the supply of electrical power to or from the machine.

At least one said divider device may comprise at least one analogue to digital converter adapted to receive said first input signal at a first analogue input terminal thereof and to receive said second input signal at a reference terminal thereof.

This provides the advantage of automatically providing a digital output signal representing the ratio of the two input signals, while avoiding the necessity of carrying out numerical division to obtain the ratio of the first and second input signals.

The machine may further comprise at least one voltage scaling device connected to a reference terminal of at least one said analogue to digital converter and adapted to receive at least one said first electrical input signal.

This provides the advantage of allowing maximum use to be made of the available input voltage range of the analogue to digital converter.

At least one said divider device may comprise a first analogue to digital converter adapted to receive at least one said first electrical input signal, at least one second analogue to digital converter adapted to receive at least one said second electrical input signal, and a numerical divider device for receiving digital output signals from said first and second analogue to digital converters and providing a digital output signal related to the ratio of at least one said first electrical input signal and at least one said second electrical input signal.

The rotor position sensor means may include at least one first sensing coil adapted to be magnetically coupled to a magnetic field generated by current flowing in a conductor in series with at least one said second or first winding.

The voltage scaling means may comprise at least one voltage divider connected between the reference terminal of a respective analogue to digital converter and ground and having a respective first terminal at which the voltage is substantially half of the reference voltage applied to the corresponding analogue to digital converter, wherein a respective said first sensing coil is connected between said first terminal and an input terminal of the corresponding analogue to digital converter.

The divider means may comprise at least one analogue divider.

This provides the advantage that the division step to obtain the ratio of the first and second input signals does not need to be carried out numerically, as a result of which the control signals can be rapidly derived without the use of expensive digital devices.

The rotor position sensor means may be adapted to determine the ratio of rate of change of current in at least one said first winding to rate of change of current in at least one said second winding.

The rotor position sensor means may further comprise at least one second sensing coil adapted to be coupled to a magnetic field caused by current flowing in a conductor in series with at least one said second winding.

The divider means may be adapted to (i) receive at least one first electrical input signal related to the rate of change of induced current in at least one field winding, and (ii) receive at least one respective second electrical input signal related to the voltage across at least one respective armature winding.

According to another aspect of the present invention, there is provided a method of controlling an electrical machine for converting electrical energy into mechanical energy and/or mechanical energy into electrical energy, the machine having a rotor having a plurality of rotor poles, and a stator for rotatably receiving said rotor and having (i) field magnet means for generating a first magnetomotive force between said rotor and said stator and including at least one first electrical winding, and (ii) armature magnet means including at least one second electrical winding adapted to carry electrical current varying in synchronism with rotation of said rotor relative to said stator to generate a second magnetomotive force having a component transverse to said first magnetomotive force, the method comprising:

detecting at least one electrical signal related to the rotational position of the rotor relative to the stator and induced in a respective said first or second electrical winding as a result of current passing through a respective second or first electrical winding;

receiving at least one first electrical input signal related to the rate of change of current in at least one said first or second winding;

receiving at least one respective second electrical input signal related to the voltage across at least one respective said second or first winding, current through which causes at least part of at least one said first electrical signal; and providing at least one respective control signal related to the ratio of at least one said first electrical input signal and at least one said second electrical input signal for controlling supply of electrical current to or from the or each said second electrical winding.

The method may further comprise providing a digital control signal.

The method may further comprise inputting said first input signal to a first analogue input terminal of an analogue to digital converter, and inputting said second input signal to a reference terminal of said analogue to digital converter.

The method may further comprise determining the ratio of rate of change of current in at least one said first winding to rate of change of current in at least one said second winding.

The method may further comprise (i) receiving at least one said first electrical input signal related to the rate of change of induced current in at least one field winding, and (ii) receiving at least one respective said second electrical input signal related to the voltage across at least one respective armature winding.

A preferred embodiment of the invention will now be described, by way of example only, and not in any limitative sense, with reference to the accompanying drawings, in which:—

Figure 11:
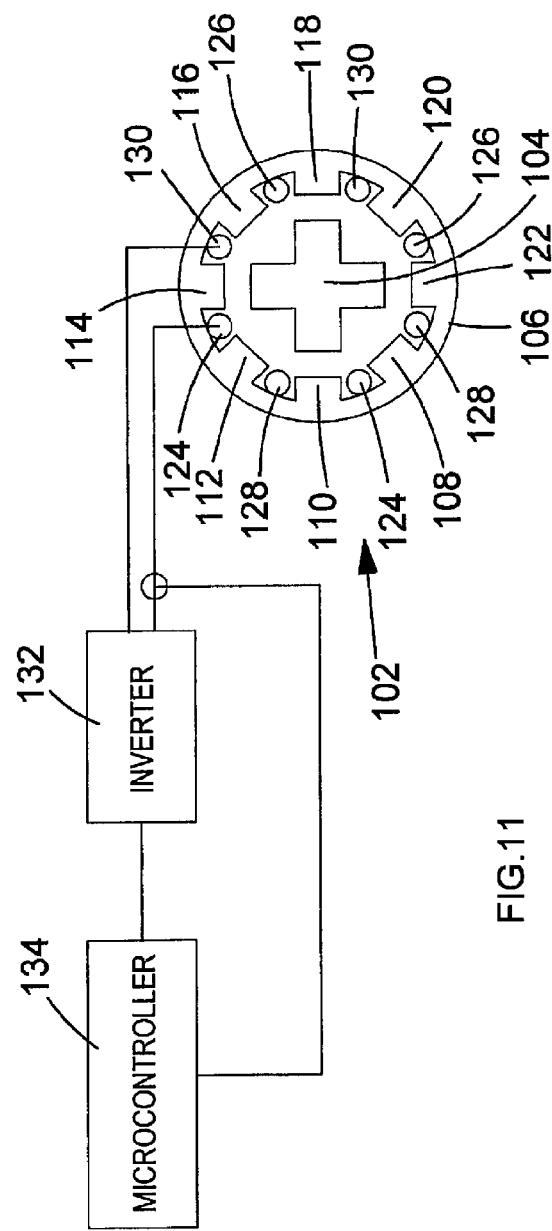
FIG. 11 is a schematic representation of a flux switching motor embodying the present invention.
Figure 12:
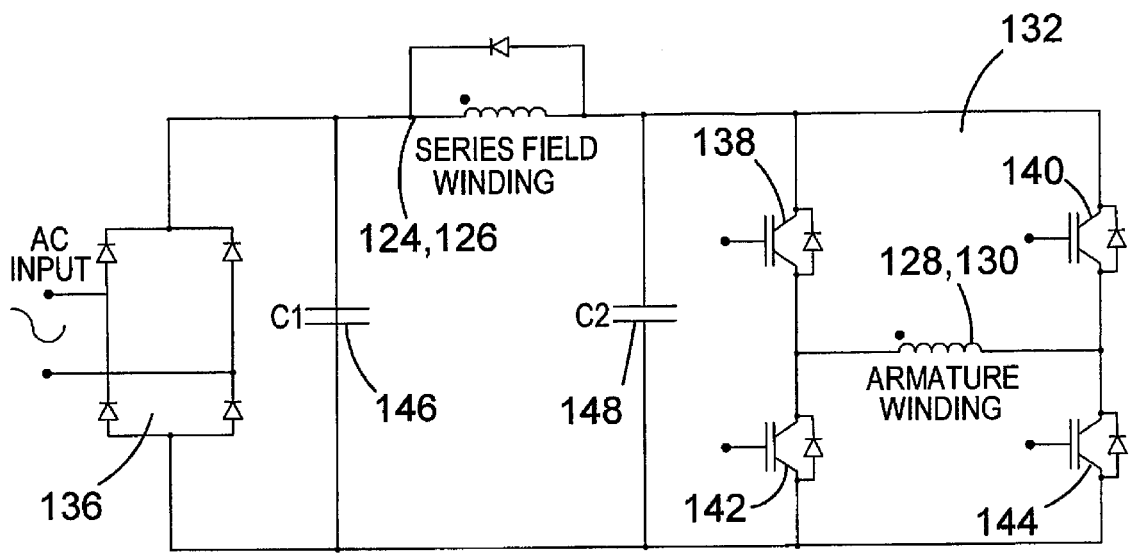
FIG. 12 is a circuit diagram of a power controller for the motor of FIG. 11.
Figure 13A:
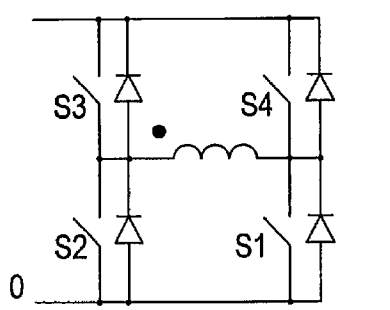
Figure 13B:
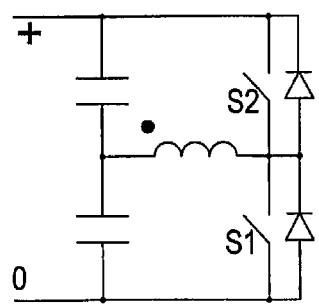
Figure 13C:
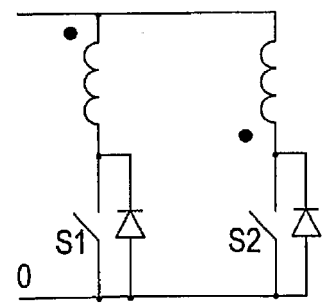
Figure 14:
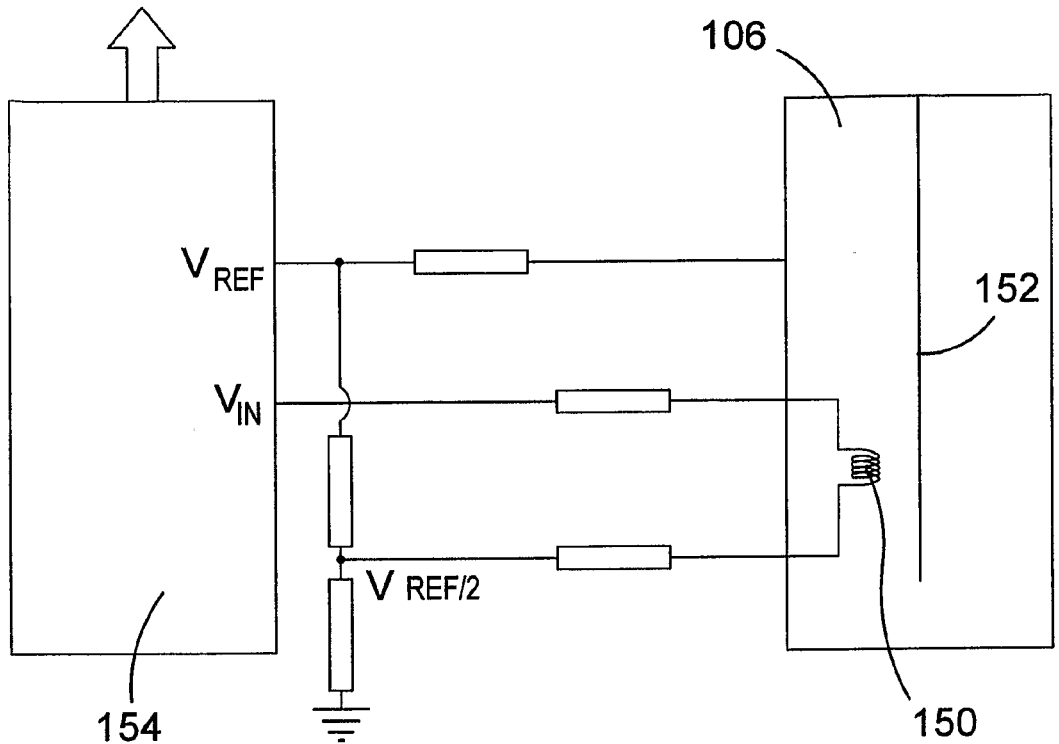
Figure 17:
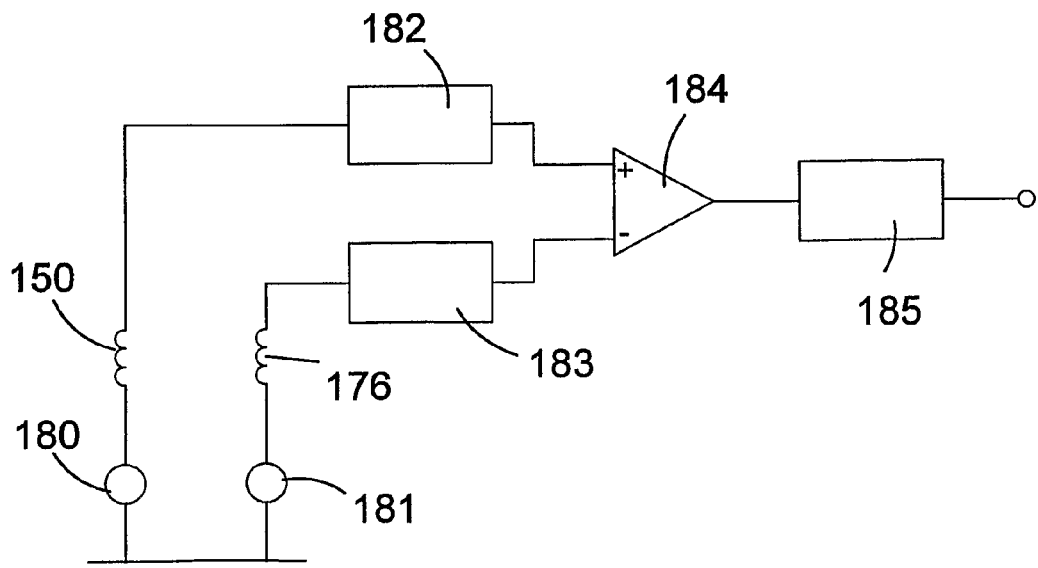
Figure 15:
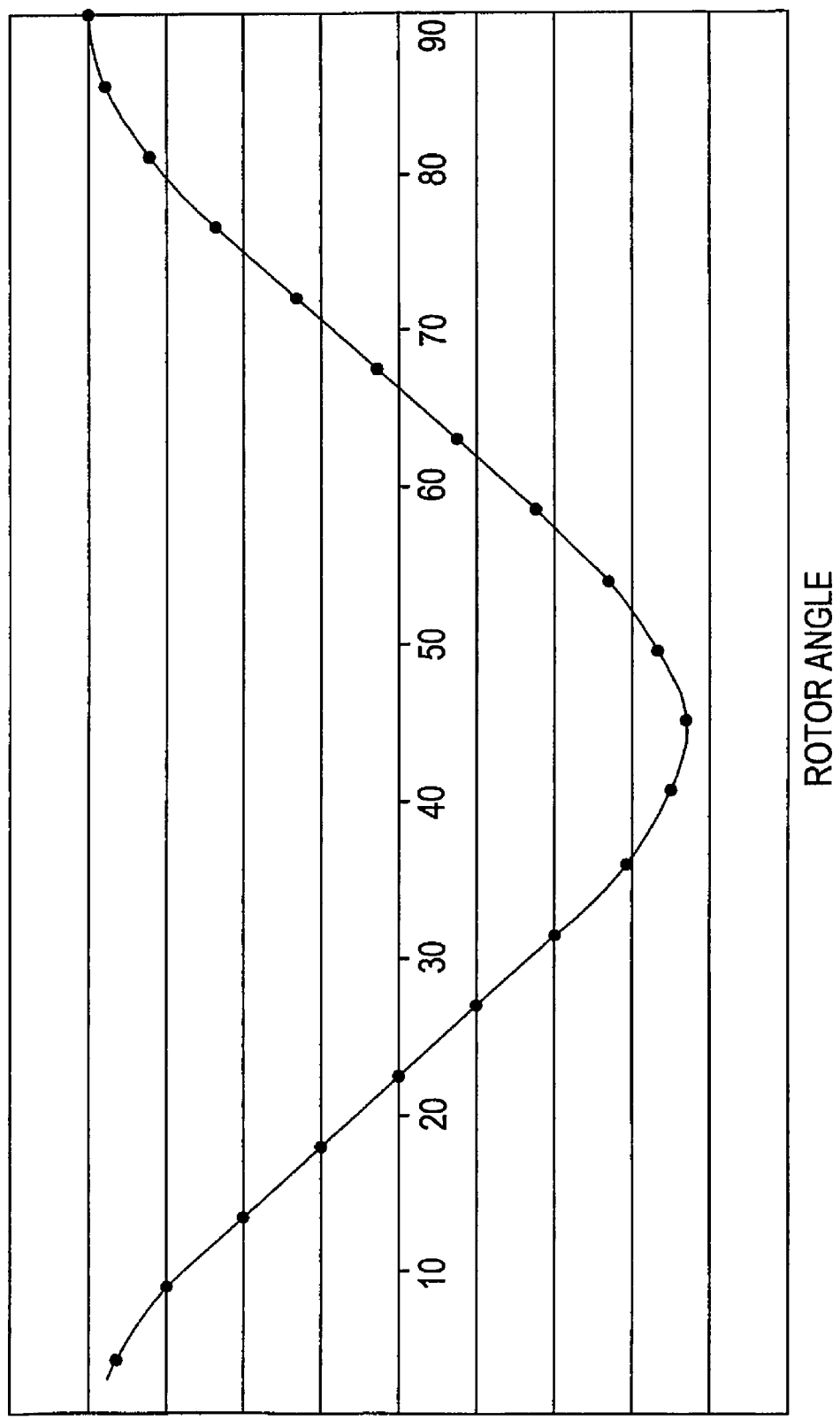
Figure 16:
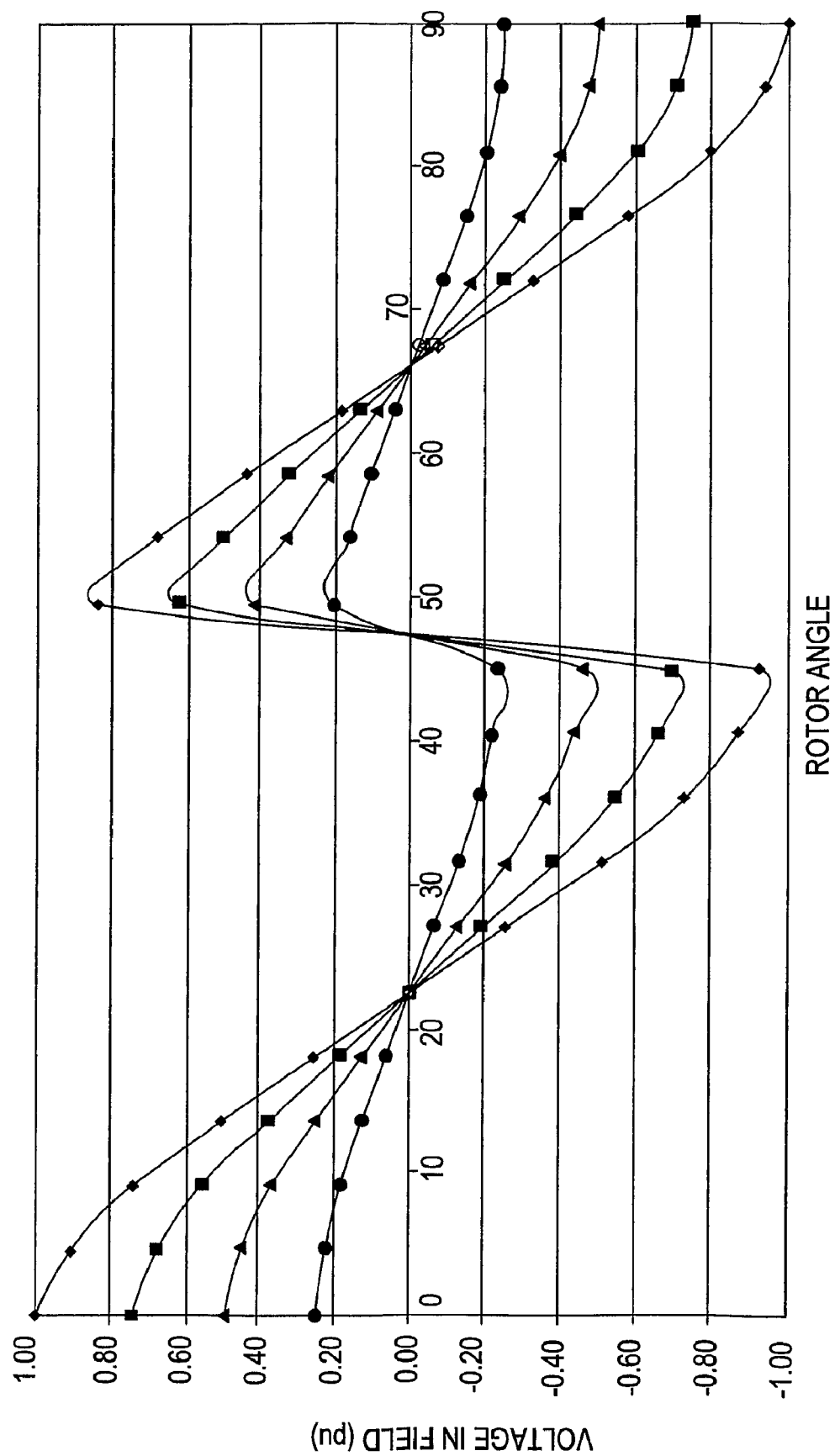
Figure 18:
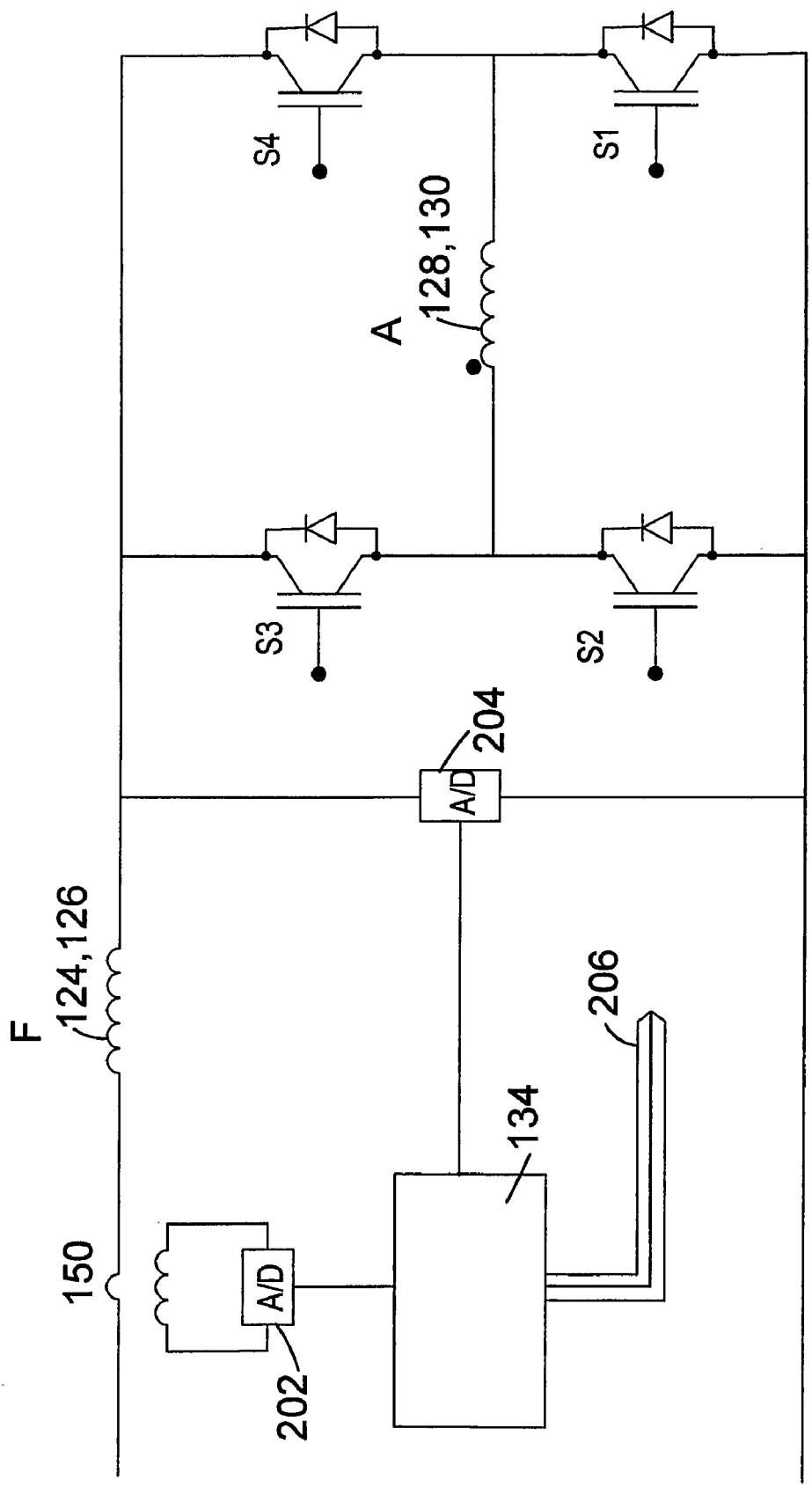
Figure 19:
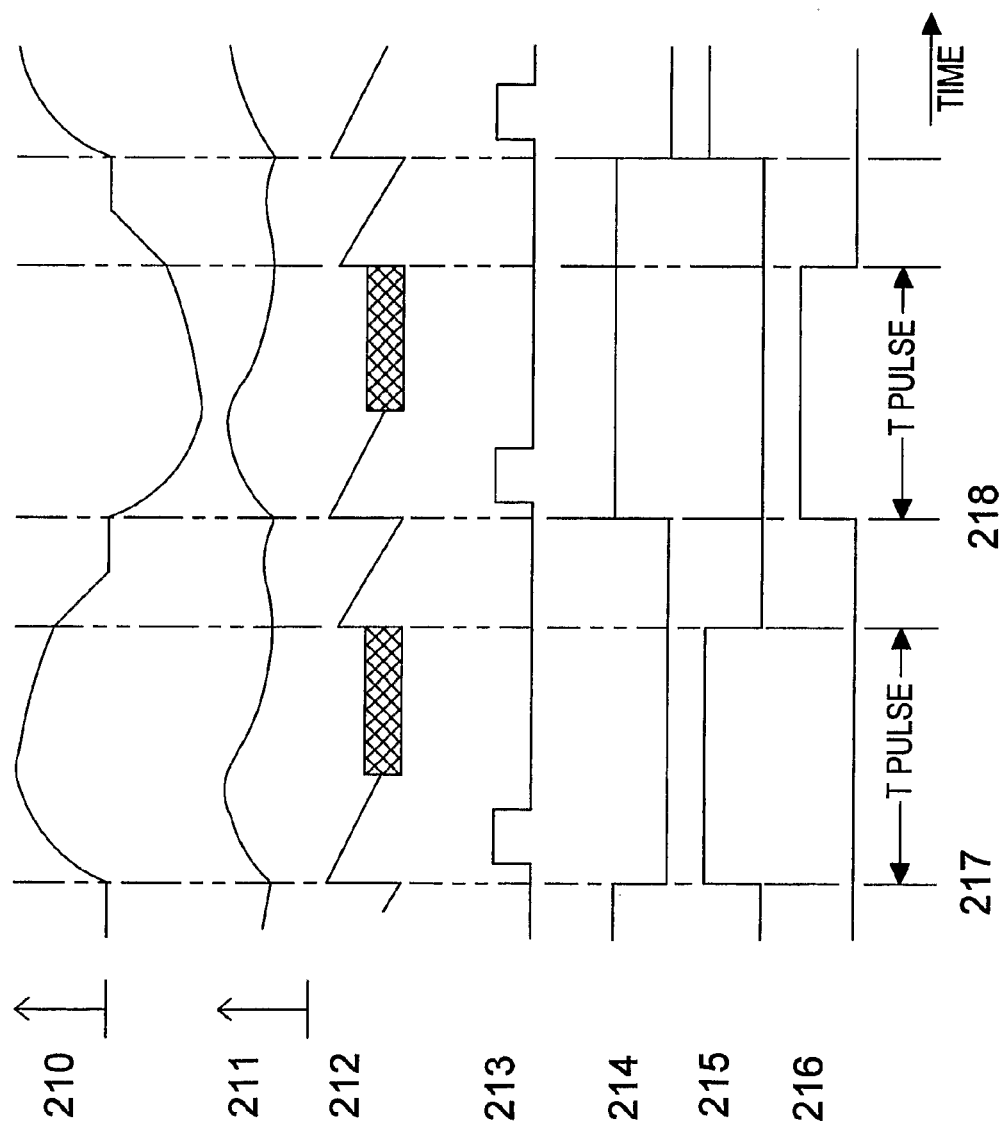

FIGS. 13*a*, 13*b* and 13*c* are circuit diagrams showing circuit arrangements for energising an armature winding of flux-switching motors of embodiments of the invention;

FIG. 14 is a circuit diagram of a first embodiment of a controller for controlling timing of the switches of the circuit of FIG. 12;

FIG. 15 is a graph showing the relationship between mutual inductance and rotor angle in the motor of FIG. 11;

FIG. 16 is a graph showing the variation in the mutually induced voltage in the field windings of the motor of FIG. 11 with rotor angle for various armature voltages;

FIG. 17 is a circuit diagram of a second embodiment of a controller for controlling the timing of the switches of the circuit of FIG. 11;

FIG. 18 is a circuit diagram of a third embodiment of a controller for controlling the timing of the switches of the circuit of FIG. 11; and FIG. 19 is a timing diagram of one embodiment of the invention within a flux switching motor control system.

Figure 10:
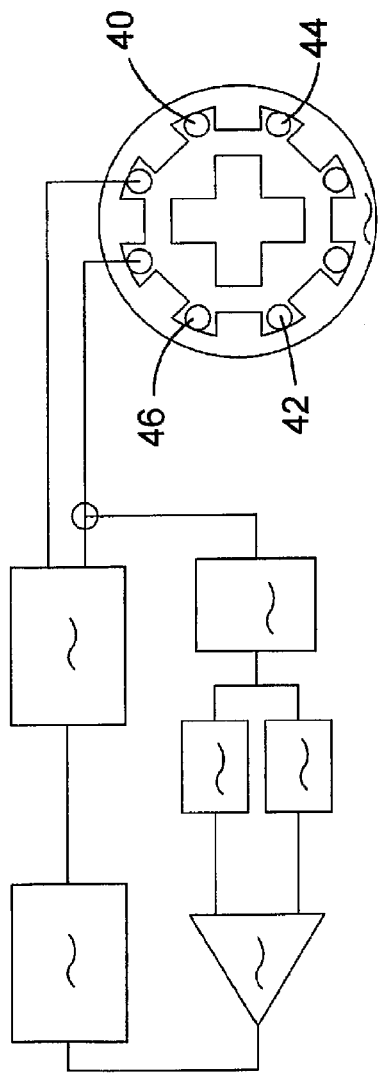
FIG. 10 is a schematic representation of another type of known flux switching motor.

A flux switching motor 102 embodying the present invention is shown in FIG. 11. A rotor 104 has four poles, and is rotatably mounted within a stator 106 having eight stator teeth 108, 110, 112, 114, 116, 118, 120, 122. In a manner similar to the known flux switching motor of FIG. 10, a pair of field windings 124, 126 extend over two stator teeth 110, 112 and 118, 120 respectively for receiving unidirectional current. Similarly, a pair of armature windings 128, 130 extend over two stator teeth 108, 110 and 116, 118 respectively for receiving current pulses of reversible polarity. The polarity of the current carried by the armature windings 128, 130 is switched in synchronism with rotation of the rotor 104 relative to the stator 106 by an inverter 132 under the control of a microcontroller 134. The microcontroller 134 can be replaced by any suitable device for generating the control signals to the inverter and thus controlling the supply of power to the armature windings 128, 130, for example an analogue or digital ASIC.

As shown in greater detail in FIG. 12, the armature windings 128, 130 are arranged in series with the field windings 124, 126 and are supplied with rectified AC voltage from a power supply 136. The inverter 132 includes two pairs of IGBT switches 138, 140, 142, 144, although FET switches can also be used. Current is caused to flow in one direction in the armature windings 128, 130 by closing switches 138, 144 and opening switches 140, 142, and is caused to flow in the other direction by opening switches 138, 144 and closing switches 140, 142. Switching of the switches 138, 140, 142, 144 is controlled by the microcontroller 134.

Capacitors 146, 148 are connected between the ends of the field windings 124, 126 and the negative supply terminal. The capacitor 146 smoothes the rectified voltage supplied by AC supply 136 so that a substantially constant voltage is applied to the field windings 124, 126. The capacitor 148 protects the field windings 124, 126 from voltage spikes caused by switching of the switches 138, 140, 142, 144, which can also be achieved by connecting a thyristor 145 in parallel with the field windings 124, 126. The thyristors 145 can be replaced by a diode.

The bi-directional current in the armature winding can be controlled using a number of circuit arrangements (inverters) examples of which are shown in FIGS. 13*a* to 13*c*.

FIG. 13*a* shows a full bridge inverter which employs four semiconductor switches and four diodes. Turning on the switches $S_1$ and $S_3$ allows positive current to flow through the armature winding. Turning on the switches $S_2$ and $S_4$ allows negative current to flow through the armature winding. Once current is established in either direction additional operating modes can be employed whereby one switch and one diode conduct with zero voltage being applied to the armature winding.

Figure 1:
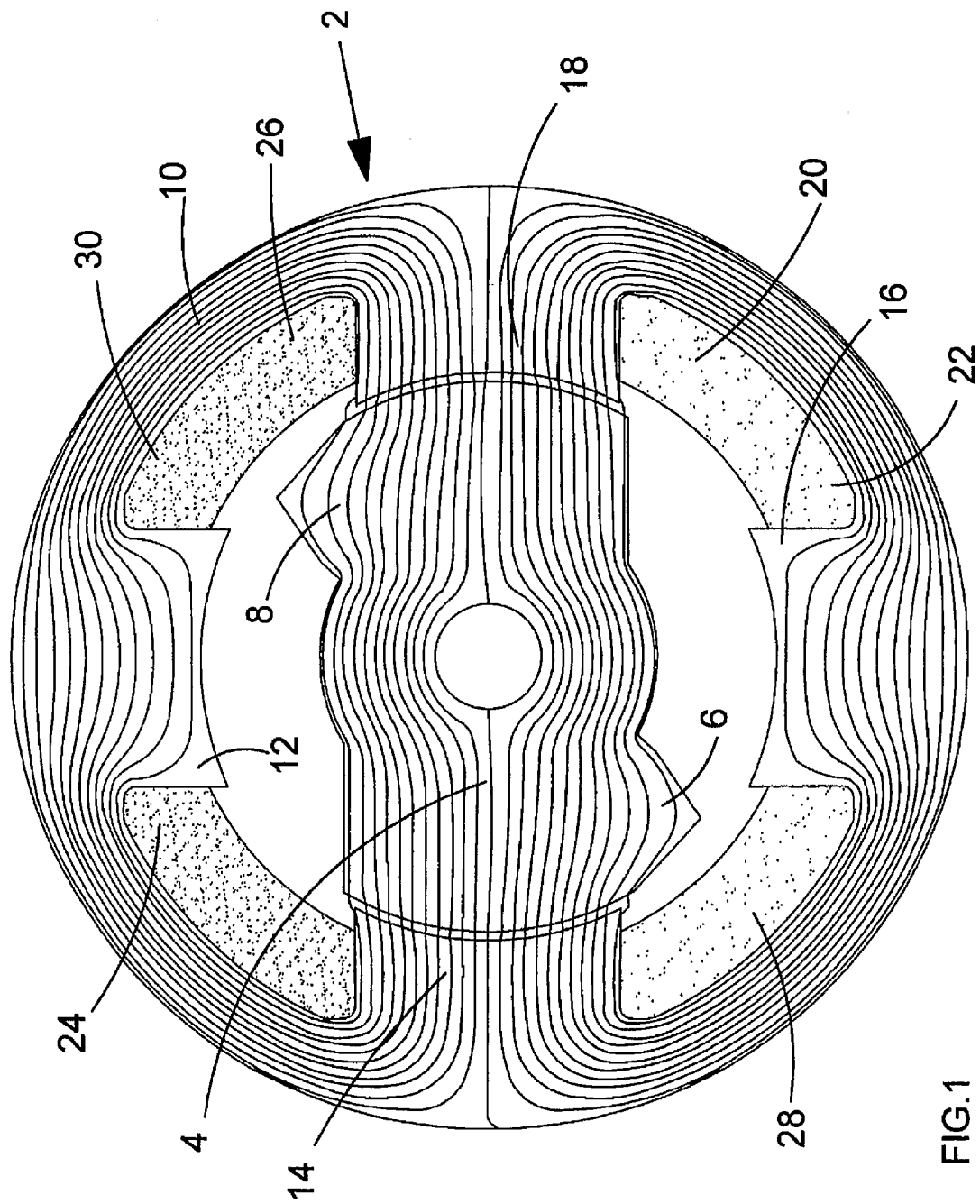
FIGS. 1 to 9 show the principle of operation of an existing flux switching motor.
Figure 2:
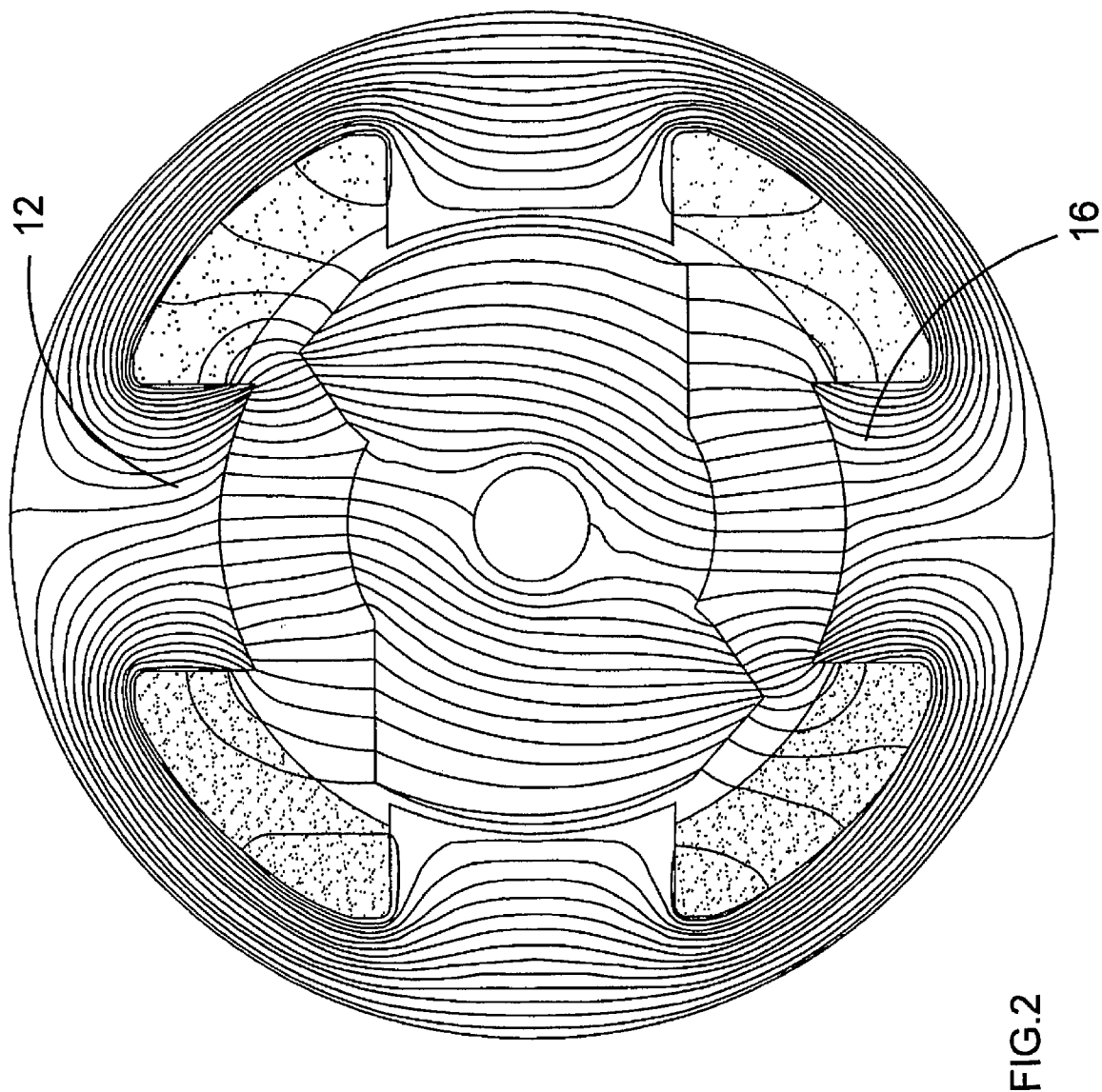
Figure 3:
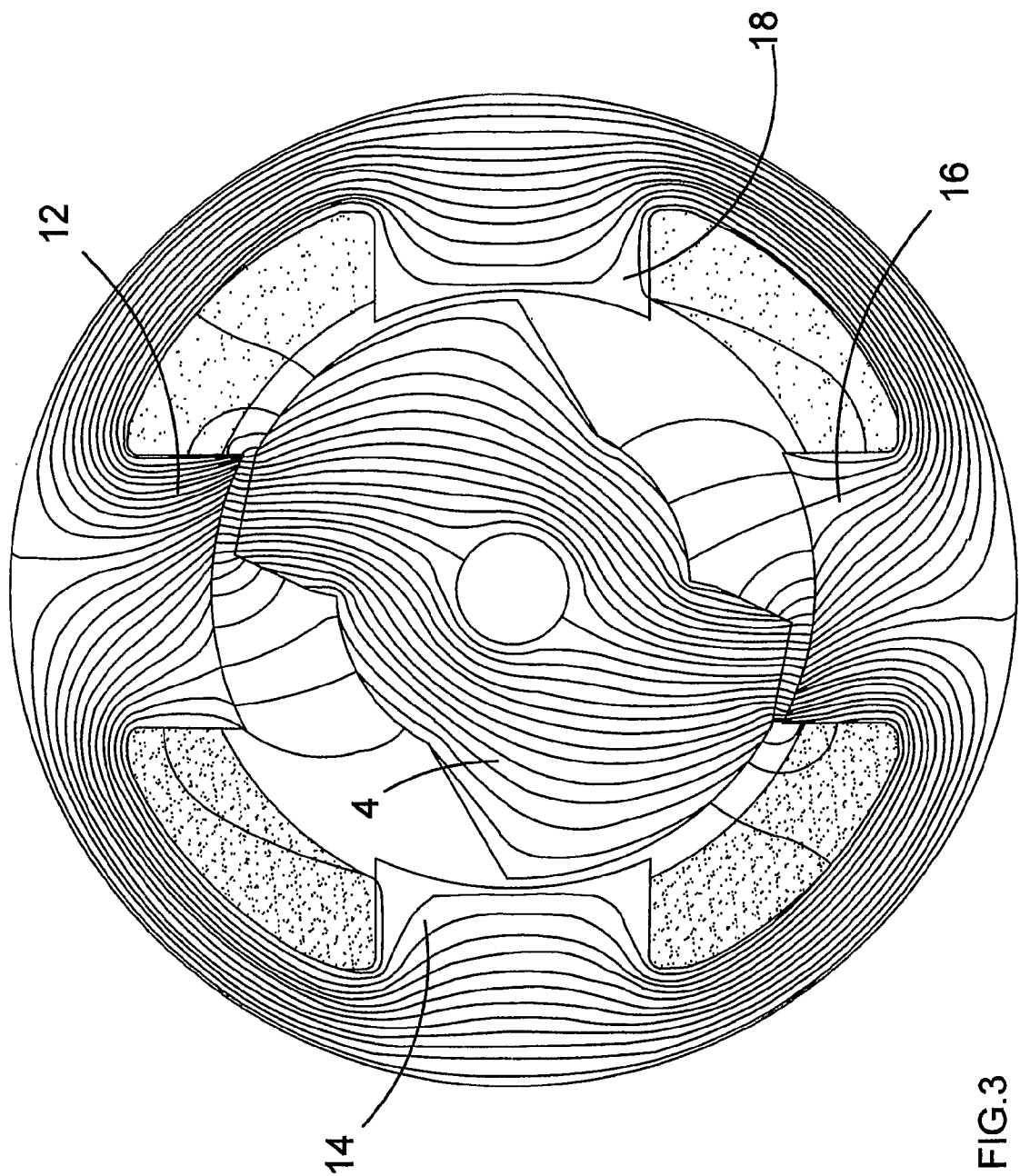
Figure 4:
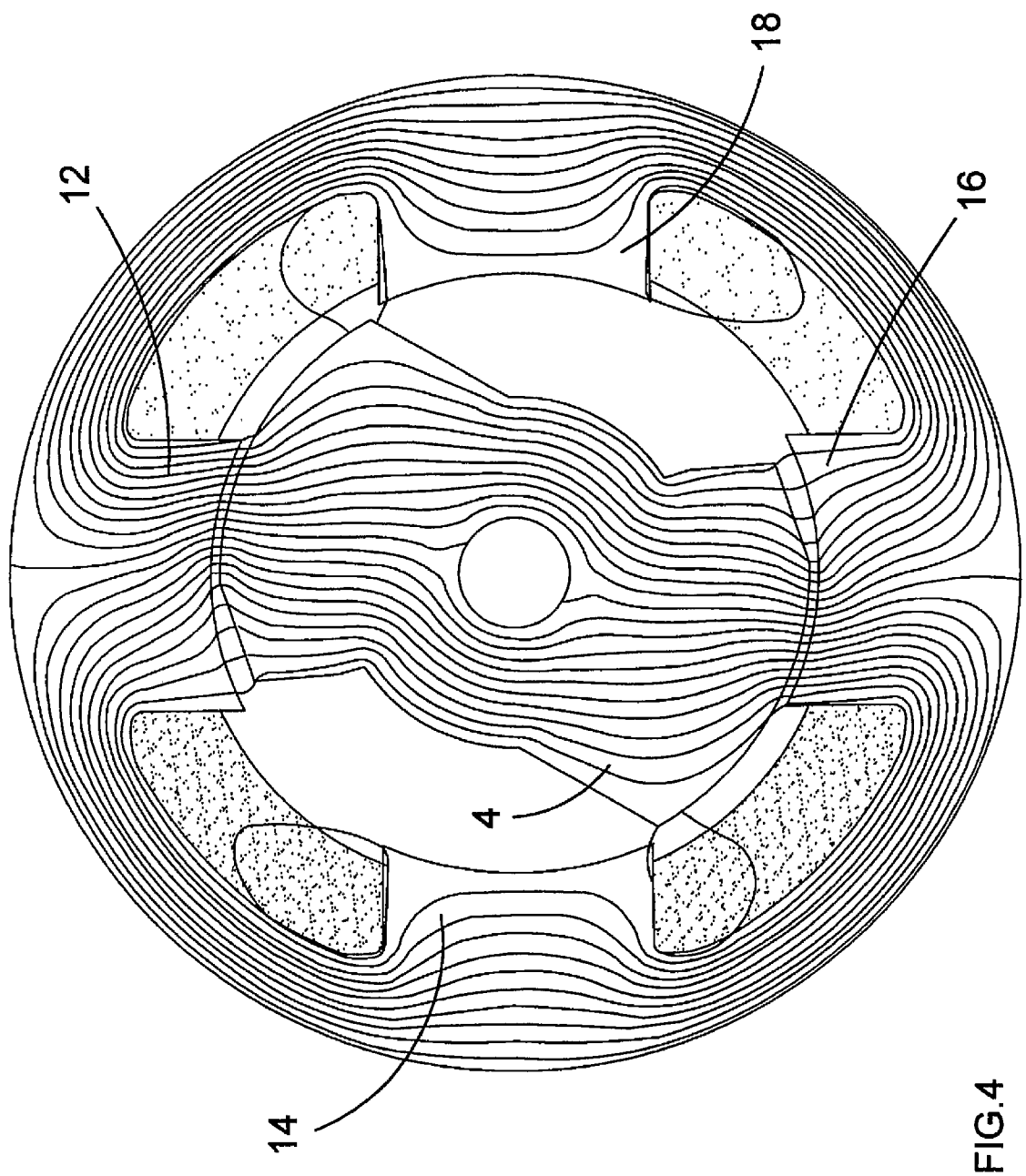
Figure 5:
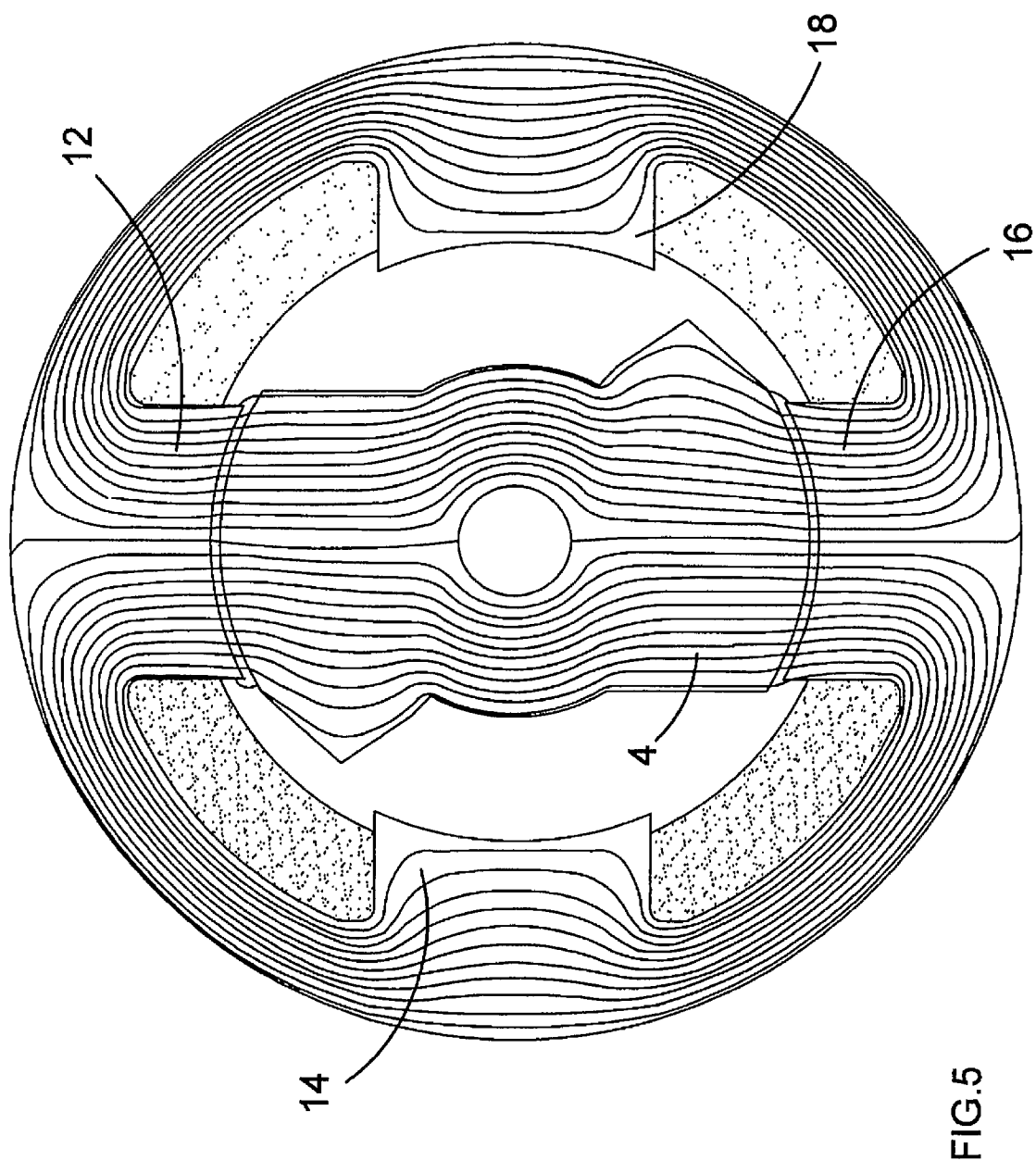
Figure 6:
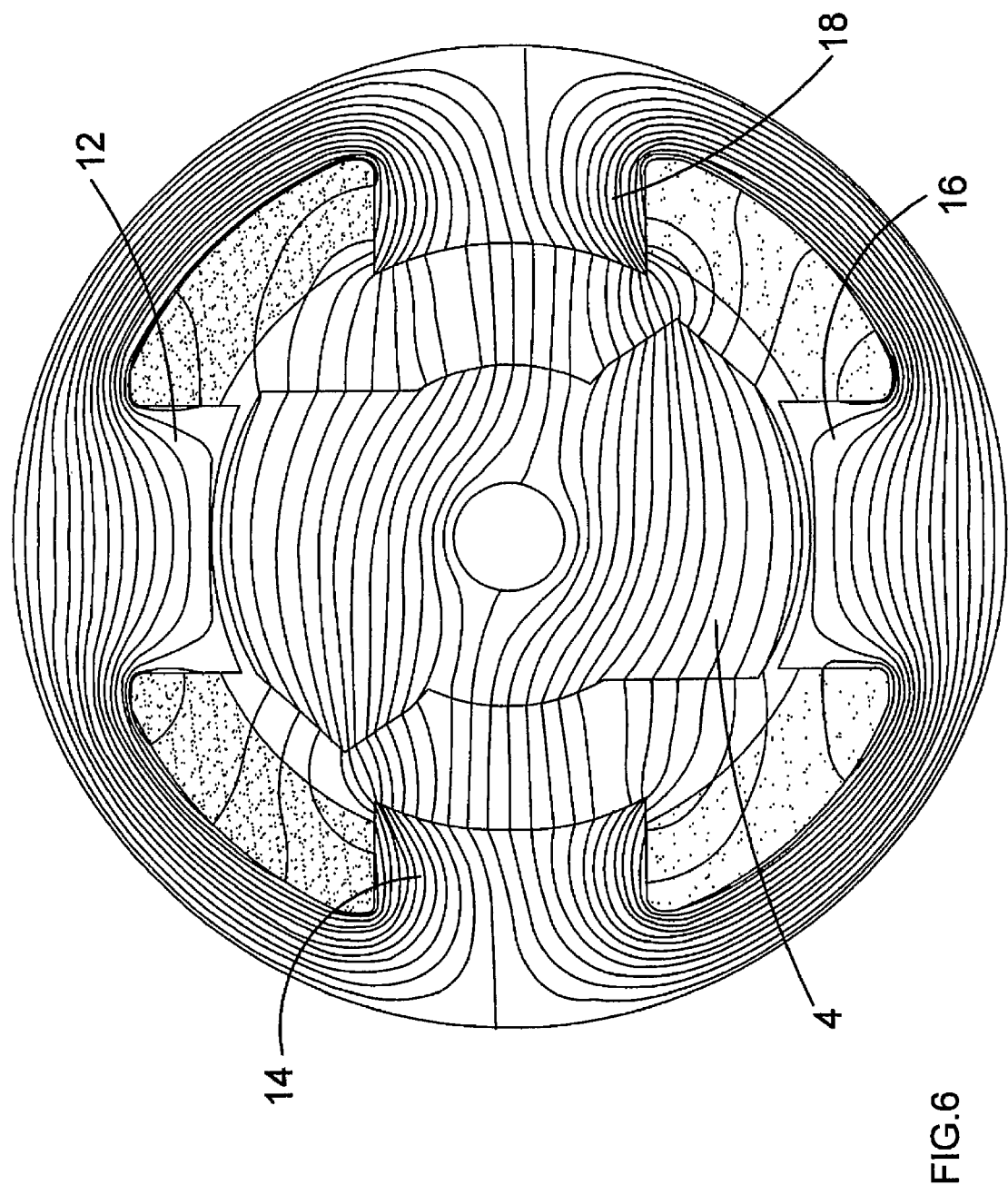
Figure 7:
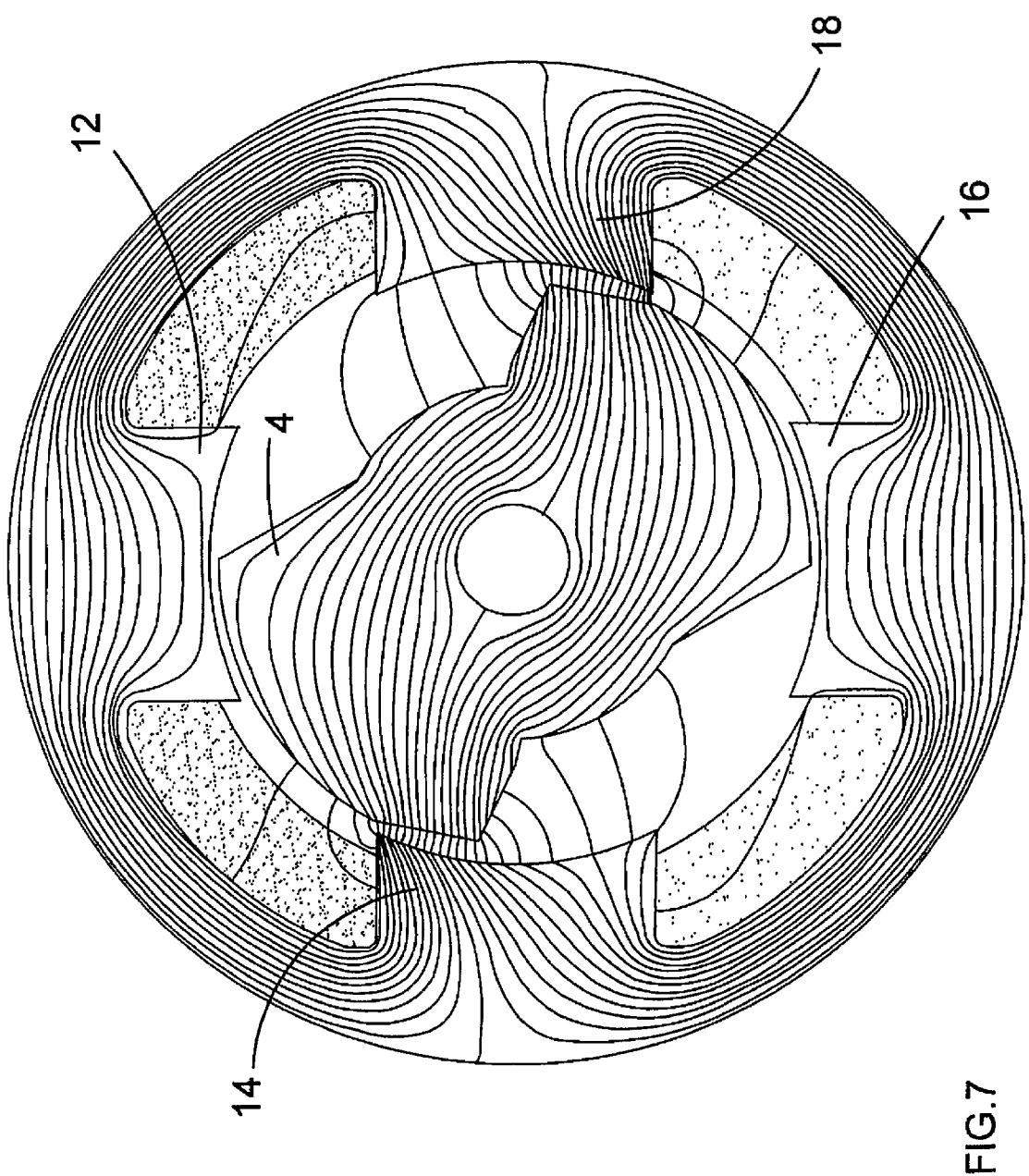
Figure 8:
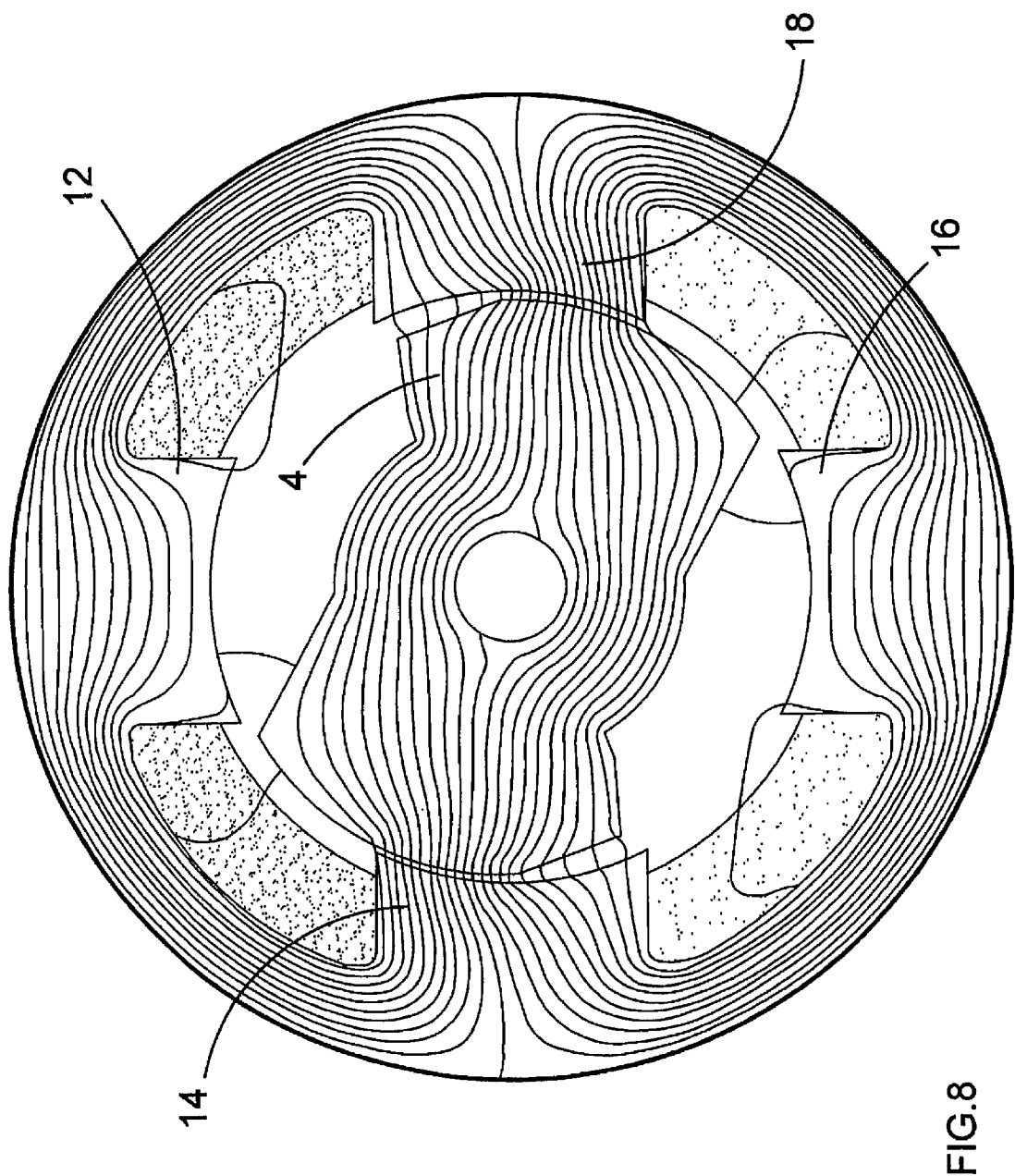
Figure 9:
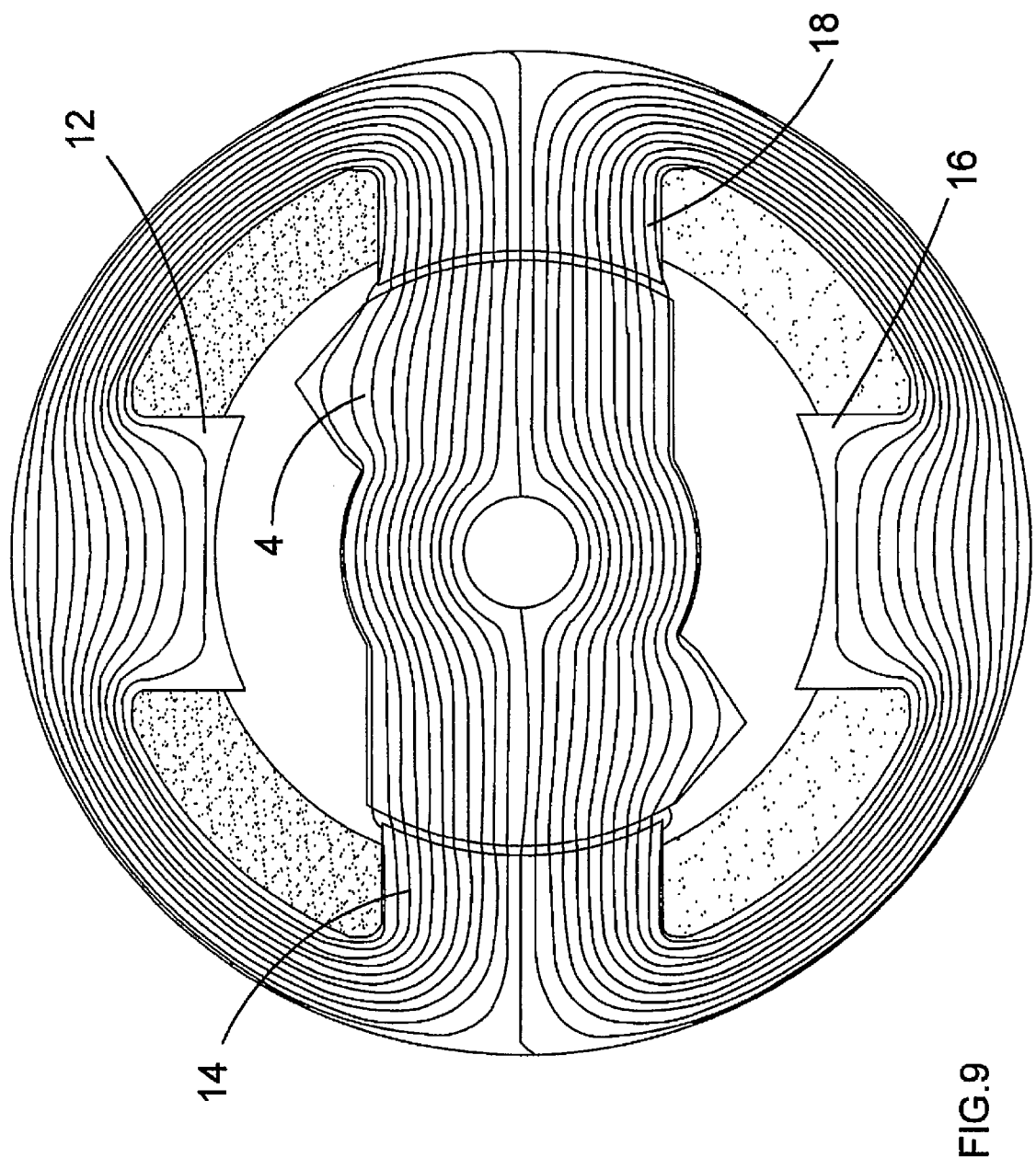

FIG. 13*b* shows a further inverter circuit in which two semiconductor switches are required in conjunction with two capacitors. The two capacitors form a bipolar power supply relative to the node between the two capacitors. Turning on the switch $S_1$ allows positive current to flow through the armature winding. Turning on the switch $S_2$ allows negative current to flow through the armature winding. The diode in parallel with each switch conducts the current when the opposite switch is turned off. Alternatively, each armature winding part is split into two coils which are closely magnetically coupled. The armature coils are wound in opposite directions and may be bifilar wound where appropriate and connected, for example, as described with reference to FIG. 6 of WO 98/05112 such that each of the armature windings comprises four coils connected together in series or in parallel and wound around the stator poles such that the active portions of adjacent coils are accommodated within the same stator slot. These two armature windings can then be connected to a further inverter circuit as described in WO 98/05112 and shown in FIG. 13*c*. Turning on the switch $S_1$ allows positive current to flow through the armature winding. Turning on the switch $S_2$, energises the second of the armature windings, and as this is connected to the power supply in the opposite manner the effective current in the armature slots is negative. The diode in parallel with each switch conducts the current when the opposite switch is turned off. Referring to FIG. 14, in which the motor stator 106 containing the field and armature windings is represented schematically, a coil 150 is magnetically coupled to a conductor 152 carrying the field current, such as a lead of one of the field windings 124, 126. As a result, a voltage is induced in the coil 150 which is proportional to the rate of change of current flowing through the field winding 124, 126. The rate of change of field current is altered by the application of voltage pulses to the armature windings 128, 130, and the magnetic coupling between the field windings and armature windings changes with rotor position in a manner which will be explained in greater detail below.

The coil 150 is connected between an analogue input terminal of an analogue to digital converter (ADC) 154, and the mid point of a voltage divider 156 connected between a reference terminal of the ADC 154 and the negative supply terminal. The voltage applied to the armature winding 128, 130 is input to the reference terminal of the ADC 154. Since the ADC provides a digital output signal proportional to the ratio of its input signal and the reference signal, the ADC 154 acts as a divider providing a digital output signal which can be directly input to the digital microcontroller 134 to control switching of the inverter 132.

The operation of the apparatus shown in FIGS. 11 to 14 will now be explained.

The present invention is based on the discovery that when the voltage across a field winding of a flux switching motor is substantially constant, the ratio of the rate of change of field current to the armature voltage provides a measure of the mutual inductance between the armature and field coils which can be used to determine the angular position of the rotor.

In particular, the voltage $v_a$ for an armature winding of the flux-switching motor is given by $$v_a = i_a R_a + \frac{d}{dt}[L_a i_a + M_{af} i_f] \qquad 1$$

$$= i_a R_a + L_a \frac{di_a}{dt} + i_a \frac{dL_a}{dt} + M_{af} \frac{di_f}{dt} + i_f \frac{dM_{af}}{dt}.$$

Where $i_a$ and $i_f$ are the armature and field currents, respectively, $R_a$ is the armature resistance, $L_a$ is the self inductance of the armature winding, and $M_{af}$ is the mutual inductance between the armature and field windings.

Similarly, the voltage for a field winding is given by $$V_f = i_f R_f + \frac{d}{dt}[L_f i_f + M_{af} i_a] \qquad 2$$

$$= i_f R_f + L_f \frac{di_f}{dt} + i_f \frac{dL_f}{dt} + M_{af} \frac{di_a}{dt} + i_a \frac{dM_{af}}{dt}.$$

Where $R_f$ is the resistance of the field winding and $L_f$ is the self inductance of the field winding.

As shown in FIG. 15, the mutual inductance between the armature windings 128, 130 and the field windings 124, 126 in the motor 102 of FIG. 11 varies over one electrical cycle (i.e. 90 degrees of rotation of the rotor 104 relative to the stator 106) as shown, and the operation of the motor relies on the application of alternate positive and negative voltage pulses to the armature, changing sign near to the point when the rate of change of the mutual inductance changes sign.

FIG. 16 shows how the voltage induced in the field winding 124, 126 changes as a positive voltage pulse is applied to the armature winding from 0 degrees to 45 degrees, and a negative voltage pulse is applied from 45 degrees to 90 degrees. The positive applied voltage causes a positive rate of change of armature current, and induces a voltage in the field windings 124, 126 which follows the graph of mutual inductance shown in FIG. 15. The negative applied voltage to the armature winding 128, 130 causes a negative rate of change of armature current, and induces a voltage in the field winding 124, 126 which is the inverse of the graph of mutual inductance shown in FIG. 15.

FIG. 16 shows that a unique point can be identified where the induced voltage in the field winding 124, 126 changes from positive to negative within both the positive armature pulse and the negative armature pulse, regardless of the magnitude of armature voltage. This point can be used to control the timing of switching of the inverter 132. The signal containing information relating to the rotor position can be normalised against changes in the supply voltage applied to the armature coil by dividing the measured signal in the coil 150 representing rate of change of field current by the instantaneous voltage applied across the armature winding 128, 130.

The present invention is based on the discovery that the voltage due to mutual inductance is much larger than those due to resistance effects or self inductance. In particular taking the terms of equations 1 and 2 in turn, $i_a R_a$ and $i_f R_f$ are small relative to the other terms;
$i_f dL_f/dt$ and $i_a dL_a/dt$ are voltages due to rate of change of self inductance, and are small in the flux switching motor and can be ignored; and
$M_{af} di_f/dt$ is also small because of the dc voltage across the field winding.

Equations 1 and 2 can therefore be approximated as follows:

$$v_a = L_a \frac{di_a}{dt} + i_f \frac{dM_{af}}{dt} \qquad 3$$

i.e. $\frac{di_a}{dt} = \frac{v_a - i_f dM_{af}/dt}{L_a}$ and $$v_f = L_f \frac{di_f}{dt} + M_{af} \frac{di_a}{dt}$$

$$= L_f \frac{di_f}{dt} + M_{af} \frac{(v_a - i_f dM_{af}/dt)}{L_a}.$$

i.e. $M_{af} = L_a \frac{(v_f - L_f di_f/dt)}{(v_a - i_f dM_{af}/dt)}. \qquad 4$ Since $v_f$, $L_a$ and $i_f dM_{af}/dt$ are approximately constant for a given operating point, this can be approximated to $$M_{af} \propto \frac{di_f/dt}{v_a}. \qquad 5$$

Since the mutual inductance is dependent upon rotor position, it can therefore be seen that a signal dependent upon mutual inductance can be determined from the ratio of the voltage across coil 150 (FIG. 14) and the armature voltage.

By applying these signals to the input and reference terminals of the ADC 154, a digital signal representing the ratio of the voltages can be derived much more cost effectively than in the case of numerical digital division, as a result of which no expensive processor is required. Combining equations 4 and 5 above, and ignoring the substantially constant field voltage, the following also applies.

$$M_{af} \propto \frac{di_f/dt}{di_a/dt} \text{ or } \frac{di_f}{di_a}$$

The ratio of the rate of change of field current to the rate of change of armature current can be found by using a second coil, mutually coupled to a conductor carrying the armature current and used in place of the signal representing the armature current.

FIG. 17 shows a further implementation involving a totally analogue solution. Two coils, 150 and 176 produce analogue voltages which are related to the rate of change of field current and the rate of change of armature current respectively. An offset voltage, 180, 181 may be added to each coil 150, 176. The analogue voltages can be converted to logarithmic values by respective logarithmic amplifiers, 182,183. The logarithms of the two signals can then be subtracted using an operational amplifier circuit 184 and finally the inverse logarithm circuit 185 produces a signal representing the mutual inductance and position which can be used to control the motor.

A further embodiment of the invention is shown in FIG. 18, in which parts common to other embodiments are denoted by like reference numerals. The field windings 124, 126 are connected in series with the armature windings 128, 130 via switches S1 to S4, the timing of which is controlled by microcontroller 134, in a similar manner to the embodiment of FIG. 12. A coil 150 is magnetically coupled to a conductor or a lead of one of the field windings 124, 126 so that a voltage is induced in the coil 150 which is proportional to the rate of change of current flowing through the field winding 124, 126, and the voltage across the coil 150 is input to a first analogue to digital converter 202. The voltage across the armature windings 128, 130 is input to a second analogue to digital converter 204, and the outputs of the analogue to digital converters 202, 204 are input to the microcontroller 134, which carries out a numerical division process to provide an output signal on lead 206 which is related to the ratio of the outputs of the analogue to digital converters 202, 204 and is used to control timing of the switches S1 to S4. As an alternative to carrying out numerical division, the microcontroller may carry out the division process by means of look up tables stored in a suitable ROM memory (not shown). The first and second analogue to digital converters may often be part of a single channel analogue to digital converter and contain a multiplexing arrangement within it which selects one of its possible inputs for conversion.

The present invention is found to have the surprising advantage that the approximation that the ratio of the rate of change of field current to the armature voltage gives a measure of the mutual inductance between the field and armature windings which varies with rotor position relative to the stator, under certain circumstances, also holds when the voltage across the second windings varies quite significantly, which means that the machine can be easily controlled over a wide range of operating conditions.

A further embodiment of the invention is shown in FIG. 19 in which the measurement of the ratio of the rate of change of field current obtained by a coil 150 to the voltage across the armature windings during normal operation of the motor is used to control the timing of the switches in the inverter thus controlling the armature voltage pulses and the speed and torque of the motor. In FIG. 19, trace 210, represents the armature current flowing in armature windings 128,130 and trace 211 represents the current flowing in the field windings 124, 126. The armature current represented by trace 210 is bipolar, with a positive section during the first half of the picture and negative during the second half of the picture. The field current represented by trace 211 is always positive and in the same direction but contains significant ripple components. The ripple components in the field are due to the mutual interaction of the armature switching but also due to variations in the voltage across the field winding itself. Application of the methods of this invention to determine the ratio of the rate of change of field current to the armature voltage leads to a very clear signal which is strongly position dependent and is shown in trace 212. It can be seen that near the start of the application of a positive armature voltage at time 217 the signal produced by the control device according to the invention and represented by trace 212 in FIG. 19 is strongly positive and decreases thereafter during the armature current pulse. This trace 212 is therefore following the pattern of FIG. 16 but without any voltage dependency making it easy to use in a simple controller to extract the position of the rotor relative to the stator. When the rotor has moved through half an electrical cycle from time 217 to time 218, the opposite voltage polarity is applied to the armature windings 128, 130 but the application of the invention leads to a signal 212 which is again large near the start of the armature pulse and decreases steadily as the pulse progressed in a manner similar to the traces in FIG. 16 but without any dependence on voltage. In the second part of each armature current pulse the signal 212 is less well determined. This is because this trace 212 is representative of a flux switching motor in which the field and armature windings are series connected. As the armature current rises during each pulse (in either the positive or negative sense) a point is reached when the magnitude of the armature current is equal to the field current. The remainder of the pulse is then electrically different with the armature and field windings forming a direct electrical series circuit. The rate of change of field current in the field and armature windings become equivalent and the mathematical equations useful for determining the position of the rotor no longer apply. This is represented by the shaded section of trace 212.

Control of a flux switching motor can now be achieved in many different ways and one such manner will be described by example only. Trace 213 in FIG. 19 shows a time when application of the invention will lead to a reliable position dependent signal from a coil 150 coupled to a conductor carrying the field current. The high sections of 213 therefore represent timing signals to an A/D converter to implement the conversion of analogue signals to digital signals in the manner already described. Since the magnitude of the resulting signal is independent of the supply voltage of the motor the error between the signal measured and the expected magnitude of the signal can be determined during armature pulse 215 and used to adjust the timing of the next armature pulse 216 and the associated next sampling time of the signal 213. If the measured signal from trace 212 is too high it is an indication that the sample taken by the A/D converter was too early. This could arise because the speed of the motor may have slowed down from the speed over the previous electrical cycle. The error in the signal 212 relative to an expected value at a particular time therefore can be used to update an estimate of the motor speed and therefore ensure that the next armature pulse 216 is applied at a more appropriate time for optimum torque production. Trace 214 of FIG. 19 is for illustrative purposes only. It is the signal which would normally have been obtained from a traditional optical or magnetic position sensing device on the shaft of the motor. This changes state with a frequency equal to the electrical frequency of the motor. In the embodiment of the invention this is not required and would be replaced by counters or timers within a microcontroller 134 the values of which are updated by the measurement of signal 212 to maintain synchronism between the armature pulses and the rotor position.

It will be appreciated by persons skilled in the art that the above embodiment has been described by way of example only, and not in any limitative sense, and that various alternations and modifications are possible without departure from the scope of the invention as defined by the appended claims. For example, instead of switching the polarity of current flowing through the armature windings, bifilar armature windings can be provided and the winding through which current flows can be selected in synchronism with movement of the rotor relative to the stator. Also, the ratio of the rate of change of field current to the armature voltage can be obtained by means of purely analogue components. This provides the advantage that the ratio can often be determined more rapidly than in the case of digital components. Also, the features of the various embodiments described above can be combined. For example, the two coils 150, 176 described with reference to FIG. 17, instead of being connected to an analogue divider comprising logarithmic amplifiers, 182,183, operational amplifier circuit 184 and inverse logarithm circuit 185, can be connected to the input and reference terminals of an analogue to digital converter in a manner similar to the embodiment of FIG. 14, or via respective analogue to digital converters and a numerical divider, in a manner similar to the embodiment of FIG. 18.

Flux switching machines can also operate very successfully as generators. Whilst the operation of the embodiments of the invention have been described with reference to motoring operation, it will be clear that a similar rate of change of field current caused by the application of voltage pulses to the armature winding is also present in the normal operation of a flux switching generator. Measurement of the ratio of the rate of change of field current to the voltage across an armature winding provides a signal which can be used to determine the position of the rotor and hence determine the optimum operation of the generator system.

The invention claimed is:

1. An electrical machine for converting electrical energy into mechanical energy and/or mechanical energy into electrical energy, the machine comprising:
    a rotor having a plurality of rotor poles;
    a stator for rotatably receiving said rotor and having (i) at least one field magnet device for generating a first magnetomotive force between said rotor and said stator and including at least one first electrical winding, and (ii) at least one armature magnet device including at least one second electrical winding adapted to carry electrical current varying in synchronism with rotation of said rotor relative to said stator to generate a second magnetomotive force having a component transverse to said first magnetomotive force;
    at least one control device for controlling supply of electrical current to or from the or each said second electrical winding; and
    at least one rotor position sensor device for detecting at least one electrical signal related to the rotational position of the rotor relative to the stator and induced in a respective said first or second electrical winding as a result of a current passing through a respective second or first electrical winding, wherein at least one said rotor position sensor device comprises at least one divider device for (i) receiving at least one first electrical input signal related to the rate of change of current in at least one said first or second winding, (ii) receiving at least one respective second electrical input signal related to the voltage across at least one respective said second or first winding, current through which causes at least part of at least one said first electrical input signal, and (iii) providing to at least one said control device at least one respective control signal related to the ratio of at least one said first electrical input signal and at least one said second electrical input signal.

2. A machine according to claim 1, wherein at least one said divider device is adapted to provide a digital control signal.

3. A machine according to claim 2, wherein at least one said divider device comprises at least one analogue to digital converter adapted to receive said first input signal at a first analogue input terminal thereof and to receive said second input signal at a reference terminal thereof.

4. A machine according to claim 3, further comprising at least one voltage scaling device connected to a reference terminal of at least one said analogue to digital converter and adapted to receive at least one said first electrical input signal.

5. A machine according to claim 4, wherein at least one said voltage scaling device comprises at least one voltage divider connected between the reference terminal of a respective analogue to digital converter and ground and having a respective first terminal at which the voltage is substantially half of the reference voltage applied to the corresponding analogue to digital converter, wherein a respective said first sensing coil is connected between said first terminal and an input terminal of the corresponding analogue to digital converter.

6. A machine according to claim 2, wherein at least one said divider device comprises a first analogue to digital converter adapted to receive at least one said first electrical input signal, at least one second analogue to digital converter adapted to receive at least one said second electrical input signal, and a numerical divider device for receiving digital output signals from said first and second analogue to digital converters and providing a digital output signal related to the ratio of at least one said first electrical input signal and at least one said second electrical input signal.

7. A machine according to claim 1, wherein at least one said rotor position sensor device includes at least one first sensing coil adapted to be magnetically coupled to a magnetic field generated by current flowing in a conductor in series with at least one said second or first winding.

8. A machine according to claim 1, wherein at least one said divider device comprises at least one analogue divider.

9. A machine according to claim 1, wherein at least one said rotor position sensor device is adapted to determine the ratio of rate of change of current in at least one said first winding to rate of change of current in at least one said second winding.

10. A machine according to claim 9, wherein at least one said rotor position sensor device further comprises at least one second sensing coil adapted to be coupled to a magnetic field caused by current flowing in a conductor in series with at least one said second winding.

11. A machine according to claim 1, wherein at least one said divider device is adapted to (i) receive at least one first electrical input signal related to the rate of change of current in at least one field winding, and (ii) receive at least one respective second electrical input signal related to the voltage across at least one respective armature winding.

12. A method of controlling an electrical machine for converting electrical energy into mechanical energy and/or mechanical energy into electrical energy, the machine having a rotor having a plurality of rotor poles, and a stator for rotatably receiving said rotor and having (i) at least one field magnet device for generating a first magnetomotive force between said rotor and said stator and including at least one first electrical winding, and (ii) at least one armature magnet device including at least one second electrical winding adapted to carry electrical current varying in synchronism with rotation of said rotor relative to said stator to generate a second magnetomotive force having a component transverse to said first magnetomotive force, the method comprising:
    detecting at least one electrical signal related to the rotational position of the rotor relative to the stator and induced in a respective said first or second electrical winding as a result of current passing through a respective second or first electrical winding;
    receiving at least one first electrical input signal related to the rate of change of current in at least one said first or second winding;
    receiving at least one respective second electrical input signal related to the voltage across at least one respective said second or first winding, current through which causes at least part of at least one said first electrical signal; and
    providing at least one respective control signal related to the ratio of at least one said first electrical input signal and at least one said second electrical input signal for controlling supply of electrical current to or from the or each said second electrical winding.

13. A method according to claim 12, further comprising providing a digital control signal.

14. A method according to claim 13, further comprising inputting said first input signal to a first analogue input terminal of an analogue to digital converter, and inputting said second input signal to a reference terminal of said analogue to digital converter.

15. A method according to claim 12, further comprising determining the ratio of rate of change of current in at least one said first winding to rate of change of current in at least one said second winding.

16. A method according to claim 12, further comprising (i) receiving at least one said first electrical input signal related to the rate of change of current in at least one field winding, and (ii) receiving at least one respective said second electrical input signal related to the voltage across at least one respective armature winding.

* * * * *